(12) United States Patent
Cartwright et al.

(10) Patent No.: US 12,555,591 B2
(45) Date of Patent: Feb. 17, 2026

(54) MACHINE LEARNING ASSISTED SPATIAL NOISE ESTIMATION AND SUPPRESSION (71) Applicant: DOLBY LABORATORIES LICENSING CORPORATION, San Francisco, CA (US)

(72) Inventors: Richard J. Cartwright, Killara (AU); Ning Wang, Epping (AU)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 172 days.

(21) Appl. No.: 18/251,876

(22) PCT Filed: Nov. 4, 2021

(86) PCT No.: PCT/US2021/058131
§ 371 (c)(1),
(2) Date: May 4, 2023

(87) PCT Pub. No.: WO2022/098920
PCT Pub. Date: May 12, 2022

(65) Prior Publication Data
US 2023/0410829 A1 Dec. 21, 2023

Related U.S. Application Data (60) Provisional application No. 63/210,215, filed on Jun. 14, 2021, provisional application No. 63/110,228, filed on Nov. 5, 2020.

(51) Int. Cl.
G10L 21/0232 (2013.01)
G10L 25/30 (2013.01)
(Continued)

(52) U.S. Cl.
CPC .......... *G10L 21/0232* (2013.01); *G10L 25/30* (2013.01); *G10L 25/84* (2013.01); *G10L 2021/02166* (2013.01)

(58) Field of Classification Search
CPC ...... G10L 21/0232; G10L 25/30; G10L 25/84
See application file for complete search history.

(56) References Cited

U.S. PATENT DOCUMENTS 9,640,194 B1   5/2017   Nemala
9,666,183 B2   5/2017   Erik
(Continued)

FOREIGN PATENT DOCUMENTS

CN   111341331 A   6/2020
CN   111261146 A   9/2022
(Continued)

OTHER PUBLICATIONS

Deng, C. et al "DNN-based Mask Estimation Integrating Spectral and Spatial Features for Robust Beamforming" May 4, 2020, ICASSP, IEEE International Conference on Acoustics, Speech and Signal Processing, pp. 4647-4651, 5 pages.
(Continued)

Primary Examiner — Bryan S Blankenagel (57) ABSTRACT

In an embodiment, a method comprises: receiving bands of power spectra of an input audio signal and a microphone covariance, and for each band: estimating, using a classifier, respective probabilities of speech and noise; estimating, using a directionality model, a set of means for speech and noise, or a set of means and covariances for speech and noise, based on the microphone covariance for the band and the probabilities; estimating, using a level model, a mean and covariance of noise power based on the probabilities and the power spectra; determining a first noise suppression gain based on the directionality model; determining a second noise suppression gain based on the level model; selecting
(Continued)

the first or second noise suppression gain or their sum based on a signal-to-noise ratio of the input audio signal; and scaling a time-frequency representation of the input signal by the selected noise suppression gain.

15 Claims, 3 Drawing Sheets

(51) Int. Cl.
    *G10L 25/84*     (2013.01)
    *G10L 21/0216*     (2013.01)

(56) References Cited

U.S. PATENT DOCUMENTS

| | | |
|---|---|---|
| 9,972,339 B1 | 5/2018 | Sundaram |
| 10,090,001 B2 | 10/2018 | Theverapperuma |
| 10,373,612 B2 | 8/2019 | Parthasarathi |
| 10,403,299 B2 | 9/2019 | Wung |
| 10,522,167 B1 | 12/2019 | Ayrapetian |
| 10,535,362 B2 | 1/2020 | Bryan |
| 10,546,593 B2 | 1/2020 | Wung |
| 10,553,236 B1 | 2/2020 | Ayrapetian |
| 10,573,301 B2 | 2/2020 | Kupryjanow |
| 10,636,434 B1 | 4/2020 | Ramprashad |
| 10,726,856 B2 | 7/2020 | Le Roux |
| 10,785,581 B2 | 9/2020 | Aschbacher |
| 10,986,437 B1* | 4/2021 | Pan ........................ H04R 1/326 |
| 2010/0246849 A1* | 9/2010 | Sudo ........................ H03G 3/32 381/94.1 |
| 2014/0056435 A1* | 2/2014 | Kjems ..................... G10L 15/20 381/317 |
| 2014/0307886 A1 | 10/2014 | Olsson |
| 2015/0215700 A1 | 7/2015 | Sun |
| 2016/0111107 A1 | 4/2016 | Erdogan |
| 2016/0241974 A1* | 8/2016 | Jensen ................. H04R 25/505 |
| 2017/0061978 A1 | 3/2017 | Wang |
| 2018/0301157 A1* | 10/2018 | Gunawan .............. G10L 21/034 |
| 2019/0259409 A1 | 8/2019 | Ehsan |
| 2019/0318757 A1 | 10/2019 | Chen |
| 2019/0378531 A1 | 12/2019 | Jensen |
| 2020/0066296 A1 | 2/2020 | Sargsyan |
| 2020/0312309 A1 | 10/2020 | Lin |

FOREIGN PATENT DOCUMENTS

| | | |
|---|---|---|
| JP | 2021128328 A | 9/2021 |
| JP | 2023536104 A | 8/2023 |
| RU | 2626987 C2 | 5/2016 |
| WO | 2006114101 A1 | 11/2006 |
| WO | 2017076211 A1 | 5/2017 |

OTHER PUBLICATIONS

Zhu, J. et al "Speech Enhancement Integrating the MVDR Beamforming and T-F Masking" IEEE International Conference on Signal Processing, Sep. 2019, pp. 978-982, 5 pages.

Li Xiaofei et al: "Multichannel Speech Enhancement Based on Time-Frequency Masking Using Subband Long Short-Term Memory", 2019 IEEE Workshop on Applications of Signal Processing to Audio and Acoustics (WASPAA), IEEE, Oct. 20, 2019 (Oct. 20, 2019), pp. 298-302.

Parviainen Mikko et al:, Time-Frequency Masking Strategies for Single-Channel Low-Latency Speech Enhancement Using Neural Networks, 2018 16th International Workshop on Acoustic Signal Enhancement (IWAENC), IEEE, Sep. 17, 2018, p. 51-55, 6 pgs.

\* cited by examiner

MACHINE LEARNING ASSISTED SPATIAL NOISE ESTIMATION AND SUPPRESSION

CROSS-REFERENCE TO RELATED APPLICATIONS

This application is a U.S. National Phase entry under 35 U.S.C. § 371 of International Application No. PCT/US2021/058131, filed Nov. 4, 2021, which claims priority to U.S. Provisional Application No. 63/110,228 filed on Nov. 5, 2020, and U.S. Provisional Application No. 63/210,215 filed on Jun. 14, 2021, each of which is incorporated by reference in its entirety.

TECHNICAL FIELD

This disclosure relates generally to audio signal processing, and in particular to noise estimation and suppression in voice communications.

BACKGROUND

Noise suppression algorithms for voice communications have been effectively implemented on edge devices, such as phones, laptops and conferencing systems. A common problem with bi-directional voice communications is that the background noise at each user's location is transmitted with the user's voice signal. If the signal-to-noise ratio (SNR) of the combined signal received at the edge device is too low, the intelligibility of the reconstructed voice will be degraded resulting in a poor user experience.

SUMMARY

Implementations are disclosed for machine learning assisted spatial noise estimation and suppression. In some embodiments, a method of audio processing, comprising: receiving bands of power spectra of an input audio signal and a microphone covariance for each band, wherein the microphone covariance is based on a configuration of microphones used to capture the input audio signal; for each band: estimating, using a machine learning classifier, respective probabilities of speech and noise; estimating, using a directionality model, a set of means for speech and noise, or a set of means and covariances for speech and noise, based on the microphone covariance for the band and the probabilities; estimating, using a level model, a mean and covariance of noise power based on the probabilities and the power spectra; determining a first noise suppression gain based on first outputs of the directionality model; determining a second noise suppression gain based on second outputs of the level model; selecting one of the first noise suppression gain or the second noise suppression gain, or a sum of the first noise suppression gain and the second noise suppression gain, based on a signal to noise ratio of the input audio signal; scaling a time-frequency representation of the input signal by the selected first or second noise suppression gain for the band; and converting the time-frequency representation into an output audio signal.

In some embodiments, the method further comprises: receiving, using the at least one processor, an input audio signal comprising a number of blocks/frames; for each block/frame: converting, using the at least one processor, the block/frame into subbands, each subband having different spectra than the other subbands; combining, using the at least one processor, the subbands into bands; and determining, using the at least one processor, the banded power.

In some embodiments, the machine learning classifier is a neural network that includes an input layer, an output layer and one or more hidden layers. In an example, the neural network is a deep neural network, comprising three or more layers, preferably more than 3 layers.

In some embodiments, the microphone covariance is represented as a normalized vector.

In some embodiments, the method further comprises: determining the first noise suppression gain, further comprises: calculating a probability of speech for the band; setting the first noise suppression gain equal to a maximum suppression gain if the probability of speech for the band is less than a threshold; and setting the first noise suppression gain based on a gain ramp if the calculated probability of speech for the band is greater than the threshold.

In some embodiments, the probability of speech is calculated using the set of means for speech and noise and the covariance estimated by the directionality model.

In some embodiments, the probability of speech is calculated using the set of means for speech and noise and the covariance vector estimated by the directionality model, and a multi-variable, joint Gaussian density function.

In some embodiments, the method further comprises: determining the second noise suppression gain, further comprises: setting the second noise suppression gain equal to a maximum suppression gain if the band power is less than a first threshold; setting the second noise suppression gain equal to zero if the band power is between the first threshold and a second threshold, wherein the second threshold is higher than the first threshold; and setting the second noise suppression gain based on a gain ramp if the band power is higher than the second threshold.

In some embodiments, the estimation using the directionality model uses time-frequency tiles that are classified as speech and noise but excludes time-frequency tiles that are classified as reverberation.

In some embodiments, the method further comprises: estimating, using a directionality or level model, a mean for speech based on the microphone covariance for the band and the probability of speech, further comprises: computing a time average estimate of the mean for speech using a first order low pass filter with the mean for speech and the microphone covariance vector as inputs to the filter, and weighting the inputs to the filter by the probability of speech.

In some embodiments, the method further comprises: estimating, using a directionality or level model, a mean for noise based on the microphone covariance for the band and the probability of noise, further comprises: computing a time average estimate of the mean for noise using a first order low pass filter with the mean for noise and the microphone covariance vector as inputs to the filter, and weighting the inputs to the filter by the probability of noise.

In some embodiments, the method further comprises: estimating, using a directionality or level model, a covariance for speech based on the microphone covariance for the band and the probability of speech, further comprises: computing a time average estimate of the covariance for speech using a first order low pass filter with the covariance for speech and the microphone covariance vector as inputs to the filter, and weighting the inputs to the filter by the probability of speech.

In some embodiments, the method further comprises: estimating, using a directionality or level model, a covariance noise based on the microphone covariance for the band and the probability of noise, further comprises: computing a time average estimate of the covariance for speech using a first order low pass filter with the covariance for speech and the microphone covariance vector as inputs to the filter, and weighting the inputs to the filter by the probability of noise.

In some embodiments, a system comprises: one or more computer processors; and a non-transitory computer-readable medium storing instructions that, when executed by the one or more computer processors, cause the one or more processors to perform operations of any of the preceding methods.

In some embodiments, a non-transitory computer-readable medium stores instructions that, when executed by one or more computer processors, cause the one or more processors to perform any of the preceding methods.

Other implementations disclosed herein are directed to a system, apparatus and computer-readable medium. The details of the disclosed implementations are set forth in the accompanying drawings and the description below. Other features, objects and advantages are apparent from the description, drawings and claims.

Particular implementations disclosed herein provide one or more of the following advantages. The disclosed embodiments use directionality and machine learning (e.g., a neural network) to provide low cost, high quality noise estimation and suppression for voice communication applications. The disclosed embodiments of noise estimation and suppression can be implemented on a variety of edge devices and do not require multiple microphones. The use of neural networks scales for a large variety and variability of background noise.

DESCRIPTION OF DRAWINGS

In the drawings, specific arrangements or orderings of schematic elements, such as those representing devices, units, instruction blocks and data elements, are shown for ease of description.

However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some implementations.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths, as may be needed, to affect the communication.

The same reference symbol used in various drawings indicates like elements.

DETAILED DESCRIPTION

In the following detailed description, numerous specific details are set forth to provide a thorough understanding of the various described embodiments. It will be apparent to one of ordinary skill in the art that the various described implementations may be practiced without these specific details. In other instances, well-known methods, procedures, components, and circuits, have not been described in detail so as not to unnecessarily obscure aspects of the embodiments. Several features are described hereafter that can each be used independently of one another or with any combination of other features.

Nomenclature

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." The terms "determined," "determines," or "determining" are to be read as obtaining, receiving, computing, calculating, estimating, predicting or deriving. In addition, in the following description and claims, unless defined otherwise, all technical and scientific terms used herein have the same meaning as commonly understood by one of ordinary skills in the art to which this disclosure belongs.

Overview

Traditional noise suppression solutions use two or more microphones to capture background noise, where one microphone is closer to the user's mouth and the other is further away. The signals from the two microphones are subtracted to remove the background noise that is common to both signals. This technique, however, does not work with edge devices having a single microphone, or in the case of a mobile phone, the user is shaking or turning the phone while they speak. Other noise suppression algorithms attempt to continuously find a noise pattern in the audio signal and adapt to it by processing the audio frame by frame or block by block, where each block can include two or more frames. These existing adaptive algorithms work well in certain use cases but do not scale to a large variety and variability of background noise.

Recently, deep neural networks have been used to suppress noise in voice communications. These solutions, however, require significant computation power, and are hard to implement on real-time communication systems. The disclosed embodiments use a combination of directionality and machine learning (e.g., deep neural networks) to provide low cost, high quality noise estimation and suppression for voice communication applications.

Figure 1:
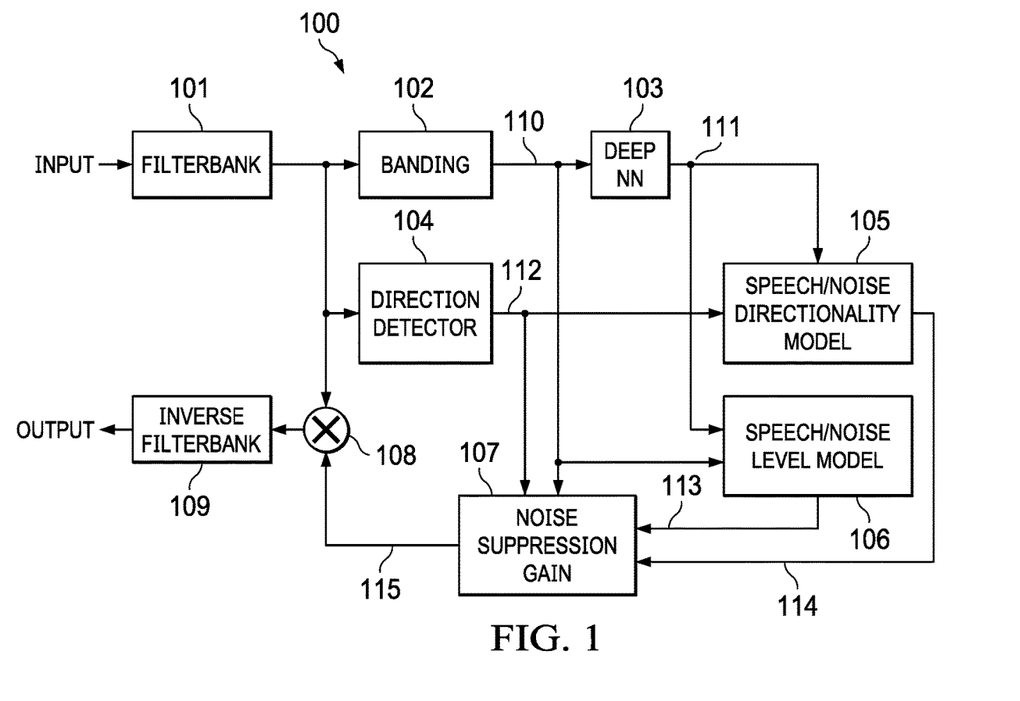
FIG. 1 is a block diagram of a machine learning assisted spatial noise estimation and suppression system, according to some embodiments.

FIG. 1 is a block diagram of a machine learning assisted spatial noise estimation and suppression system 100, according to some embodiments. System 100 includes filterbank 101, banding unit 102, machine learning classifier 103 (e.g., a neural network such as a deep neural network (DNN)), direction detection unit 104, speech/noise directionality model 105, noise level model 106, noise suppression gain unit 107, multiplying unit 108 and inverse filterbank 109. In some embodiments, filterbank 101 (e.g., a short-time Fourier transform (STFT)) receives a time-domain input audio signal and converts the time domain input audio signal into subbands, each subband having a different frequency spectra (e.g., time/frequency tiles). The subbands of each block/frame are input into banding unit 102 which combines the subbands of the block/frame into bands according to a psychoacoustic model and outputs banded power 110 (e.g. banded power expressed in dB). The subbands output by filterbank 101 are also input into direction detection unit 104, which generates and outputs microphone covariance vector 112. In some embodiments, there is one covariance vector for each band and a common banding matrix is used in banding unit 102 direction detection unit 104. In some implementations, banding unit 102 and direction detection unit 104 are a single unit which produces a band power in decibels and a covariance vector for each of the bands.

Banded power 110 is input into a machine learning classifier 103. In an embodiment, machine learning classifier 103 is a pre-trained neural network classifier that estimates and outputs probabilities 111 of a plurality of classes, including but not limited to a speech class, a stationary noise class, a nonstationary noise class and a reverberation class for each block/frame and each band. In some embodiments, the stationary noise class is used to drive speech/noise directionality model 105 and noise level model 106.

In the disclosure that follows, it assumed that the machine learning classifier estimated and outputs probabilities for speech and stationary noise. In an embodiment where the machine learning classifier outputs a probability of reverberation, the estimated probabilities of speech, stationary noise, nonstationary noise and reverberation are used to separate the reverberation from the noise. In some embodiments, any time-frequency tiles classified as reverberation are added neither to the speech/noise directionality model 105 nor noise level model 106.

Probabilities 111 are input into speech/noise directionality model 105 together with the microphone covariance vectors 112. Probabilities 111 are also input into speech/noise level model 106 together with banded power 110. For each band and each block/frame, speech/noise directionality model 105 estimates and outputs a respective mean and/or covariance 114 for speech and noise for each band, based on microphone covariance vectors 112. Noise level model 106 estimates and outputs a mean and variance 113 of noise power for each band for each block/frame. In some embodiments, noise level model 106 also outputs a mean and variance of speech.

Noise suppression gain unit 107 receives outputs 113, 114 of speech/noise directionality model 105 and noise level model 106, respectively, banded power 110 and microphone covariance vectors 112. Noise suppression gain unit 107 calculates and outputs suppression gains 115, which are used by multiplying unit 108 to scale the subbands output by filterbank 101 to suppress the noise in each subband. The subbands are then converted to a time domain output audio signal by inverse filterbank 109. Each of the components of system 100 will now be described in further detail below. In some embodiments, the output of machine learning classifier 103 is directly used as a noise gain or to calculate noise suppression gains.

Machine Learning Classifier

As described above, machine learning classifier 103 takes banded power 110 as input and provides as output probabilities 111 of speech and noise given by:

$$\{p_s(t,f), p_n(t,f)\}, \tag{1}$$

where t is the block/frame number and f is the band index, the subscript "s" represents speech and the subscript "n" represents noise. In some embodiments, the noise is stationary noise, based on the assumption there is one talker of interest who does not move around a lot, and that the noise field is therefore relatively stationary. If these assumptions are violated, the modelling performed by 105 and 106 may be inappropriate. In some embodiments, the output of machine learning classifier 103 could also include probabilities of non-stationary noise and reverberation and noise suppression gains that can be directly used by noise suppression gain unit 107.

In the illustrated example, the machine learning classifier 103 comprises a neural network (NN). Input to example NN 103 includes 61 banded powers of the current frame and an input linear dense layer maps the banded powers to 256 features. The 256 features go through a set of GRU layers, each of which contains 256 hidden units, and at last a dense layer with some nonlinear kernel. NN 103 outputs the relative weights for each class and for each band which are converted to probabilities using a softmax function. NN 103 is trained using labeled voice with noise mixed and using cross entropy as the cost function. In an embodiment, an Adam optimizer is used for the training the neural network. Other examples of machine learning classifiers include but are not limited to k-nearest neighbors, support vector machine or decision tree.

In an embodiment, NN 103 can be trained as follows:
1. Obtain a set of close-mic recorded dry clean speech. For example, the Centre for Speech Technology Voice Cloning Toolkit (VCTK);
2. Obtain a set of noise data. For example, the AudioSet data available at http://research.google.com/audioset/; and
3. Extract features for the speech and noise data before the training process begins. For example, 61 band energies (in dB) for bands spaced between, e.g., 50 Hz and 8000 Hz computed at a rate of, e.g., 50 Hz.
4. As part of the feature extraction process:
   a. determine a measure of speech power for each speech vector. For example, a speech file is passed through a voice activity detector (VAD) and the mean A-weighted power (e.g., in dBFS) is computed for all speech that passes the VAD; and
   b. determine a measure of noise power for each noise vector. For example, the mean A-weighted power (e.g. in dBFS) is computed across the vector.
5. For each speech vector on each training epoch:
   a. choose a random noise vector from the noise data set with which to associate the speech;
   b. draw a random SNR at which to mix the speech and noise. For example, from a normal distribution with mean of, e.g., 20 dB SNR and standard deviation of, e.g., 10 dB SNR;

c. determine the gain (in dB) at which to mix the noise with the speech from the chosen SNR, the pre-determined speech power (S) and the pre-determined noise power (N) according to gain=SNR−S+N;
d. apply reverb to the speech, recording in which time-frequency tiles significant reverb has been added;
e. mix the noise with the reverberated speech using the gain provided. Since the features are on a dB scale, "mixing" can be approximated by taking the max( ) of the reverberated speech power and the gain-applied noise power in each time-frequency tile. While doing so record in which time-frequency tiles noise ends up dominating over the reverberated speech. The final training vector to present to the NN during training consists of 61 band energies per frame along with a ground truth class label based on whether noise, speech or reverb dominated in each time-frequency tile during the above procedure; and
f. The training vector is shown to the network and cross-entropy loss is descended against the ground truth computed during the above procedure.

Microphone Covariance Matrix

In some embodiments, filterbank 101 is implemented using a short-time Fourier transform (STFT). Let $X_t(k)$ be the kth bin data (subband) of STFT of block/frame t for all microphone inputs. $X_t(k)$ is a vector of length N, where N is the number of microphones, M is the number of subbands and a is a weighting factor weighting contributions of past and estimated covariances. In real-time audio processing, the microphone covariance of band f is calculated by:

$$C_t(f) = \alpha \cdot C_{t-1}(f) + (1-\alpha) \cdot \hat{C}_t(f), \quad [2]$$

$$\hat{C}_t(f) = \sum_{k=B(f)}^{M} X_t(k) \cdot X_t^H(k), \text{ and} \quad [3]$$

where B(f) is the set of all STFT bins (i.e., subbands) that belong to band f.

Note that Equations [2] and [3] hold for "rectangular banding", in which each subband contributes to exactly one output band with a gain of 1. In general, there is some weight $w_{k,f}$ in the range [0,1] which describes how much input subband k contributes to output band f. For one subband k all the weights $w_{k,f}$ must sum to 1 over all the bands f. In this way arbitrary-shaped banding can be performed. For example banding that is cosine or triangular shaped in linear, log or Mel frequency can be used in addition to rectangular banding.

$$\hat{C}_t(f) = \sum_{k=B(f)}^{M} w_{k,f} \cdot X_t(k) \cdot X_t^H(k), \quad [4]$$

$$\sum_{k=B(f)} w_{k,f} = 1. \quad [5]$$

In an embodiment, the banded power can be computed directly from filterbank 101. For example, a non-uniform filterbank that has the banding scheme embedded. In such an embodiment, decimation is not used and a block rate defines the block frame t.

To simplify notation, a normalized covariance matrix is rearranged to be a real vector 112, $v_{t,f}$, because the covariance matrix is Hermitian and its diagonal elements are real. A normalized covariance is the covariance matrix divided by its trace so that it represents direction only, with any level component removed.

If an element of this covariance matrix is denoted as $c_{m,n}$, a re-arranged vector for a 3 microphone system is given by, where m and n index the covariance matrix elements:

$$v_{t,f} = \begin{pmatrix} c_{1,1} \\ c_{2,2} \\ c_{3,3} \\ Re\{c_{1,2}\} \\ Im\{c_{1,2}\} \\ Re\{c_{1,3}\} \\ Im\{c_{1,3}\} \\ Re\{c_{2,3}\} \\ Im\{c_{2,3}\} \end{pmatrix}. \quad [6]$$

In some embodiments, $v_{t,f}$ is normalized. Systems with more or fewer microphones would have more or fewer elements, and thus the system is scalable to systems with any number of microphones.

Speech/Noise Directionality Model

In some embodiments, speech/noise directionality model 105 takes covariance vectors (one per band), $v_{t,f}$, and probabilities 111 output by machine learning classifier 103 as input, and estimates means and/or covariance matrix of $v_{t,f}$. There are at least two embodiments for estimating the mean and/or covariance matrix of $v_{t,f}$, which are described as follows:

1. Estimate means of speech and noise only, and use the estimated means as the directionality model:

$$\mu_n(t,f) = [1 - wp_n(t,f)] \cdot \mu_n(t-1,f) + wp_n(t,f) \cdot v_{t,f}, \text{ and} \quad [7]$$

$$\mu_s(t,f) = [1 - wp_s(t,f)] \cdot \mu_s(t-1,f) + wp_s(t,f) \cdot v_{t,f} \quad [8]$$

In Equations [7] and [8], $\mu_n(t, f)$ and $\mu_s(t, f)$ are the directionality models for noise and speech, respectively, for block/frame t and frequency band f. They are the means of the normalized microphone covariance matrix. Note that w used in Equations [7] and [8] and hereafter is a weighting factor that controls the length of a time averaging window, which can be different for speech and noise or mean and variance.

2. The means and covariance vectors for noise and speech define the spatial model, which can be calculated as:

$$\mu_n(t,f) = [1 - wp_n(t,f)] \cdot \mu_n(t-1,f) + wp_n(t,f) \cdot v_{t,f}, \quad [9]$$

$$\mu_s(t,f) = [1 - wp_s(t,f)] \cdot \mu_s(t-1,f) + wp_s(t,f) \cdot v_{t,f}, \quad [10]$$

$$\Sigma_n(t,f) = [1 - wp_n(t,f)] \cdot \Sigma_n(t-1,f) + wp_n(t,f) \cdot v_{t,f} v_{t,f}^H, \quad [11]$$

$$\Sigma_s(t,f) = [1 - wp_s(t,f)] \cdot \Sigma_s(t-1,f) + wp_s(t,f) \cdot v_{t,f} v_{t,f}^H. \quad [12]$$

Noise Level Model

The noise level model 106 takes banded power 110 ($L_{t,f}$) in dB as input, and estimates the mean and variance of the noise for band f and block/frame t:

$$\mu_L(t,f) = [1 - wp_n(t,f)] \cdot \mu_L(t-1,f) + wp_n(t,f) \cdot L_{t,f}, \quad [13]$$

$$\sigma_L^2(t,f) = [1 - wp_n(t,f)] \cdot \sigma_L(t-1,f) + wp_n(t,f) \cdot [L_{t,f} - \mu_L(t,f)]^2. \quad [14]$$

Note that in Equations [7]-[14] a time average is used to estimate the mean and covariance of a random variable (either level or directionality) under the assumption that the random process is ergodic and is stationary for a period of time. The average is achieved using a first order low pass filter model, where, for each frame, the input to the low pass filter (mean or covariance) is weighted by the probability of speech or noise.

Noise Suppression Gain Calculation Based on Level Model

Figure 2:
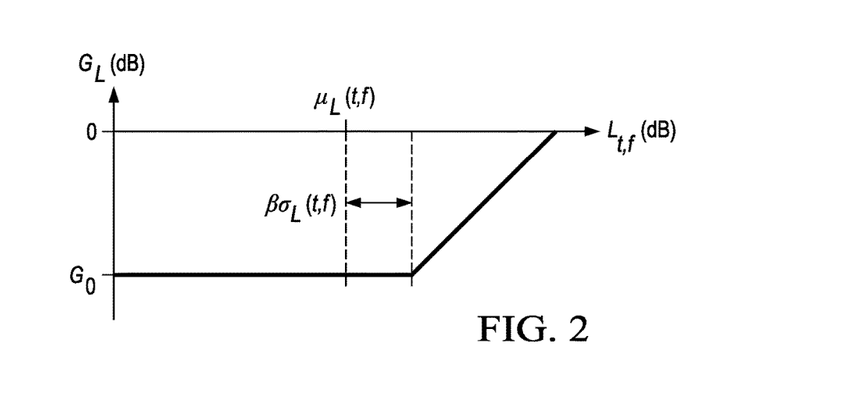
FIG. 2 is a diagram illustrating a noise suppression gain calculation based on a level model, according to some embodiments.

FIG. 2 is a diagram illustrating a noise suppression gain, $G_L$ (b, f), calculation based on noise level model 106, according to some embodiments. The vertical axis is gain in dB and the horizontal axis is level in dB In FIG. 2, $G_0$ is the maximum suppression gain, and the slope of the gain ramp, $\beta$, and k are tuning parameters:

$$G_L(t,f) = \begin{cases} G_0, \text{ when } L_{t,f} \leq \mu_L(t,f) + \beta\sigma_L(t,f) \\ \min\{0, G_0 + k[L_{t,f} - \mu_L(t,f) - \beta\sigma_L(t,f)]\}, \text{ otherwise} \end{cases} \quad [15]$$

If the current signal to noise level is greater than a pre-defined signal to noise ratio threshold (See Equation [19]), the noise suppression gain is $G_L$, otherwise, the speech/noise directionality model 105 is used to calculate $G_S$. The system calculates the probability of speech for band f and for block/frame t using one of at least two methods:

1. Use the mean of the normalized microphone covariance vector $v_{t,f}$ and speech/noise directionality model 105 to compute the probability of speech:

$$Pr\{S\} = \max\left\{1, \left\{\min\left\{0, \frac{[v_{t,f} - \mu_n(t,f)]^T [v_{t,f} - \mu_s(t,f)]}{\|\mu_s(t,f) - \mu_n(t,f)\|_2}\right\}\right\}\right\}. \quad [16]$$

2. Use the mean and the vector $v_{t,f}$ as the directionality model (assuming the elements of vector $v_{t,f}$ are joint Gaussian), to compute the probability of speech:

$$Pr\{S\} = \frac{\mathcal{N}\left(v_{t,f}, \mu_s(t,f), \sum_S(t,f)\right)}{\mathcal{N}\left(v_{t,f}, \mu_s(t,f), \sum_S(t,f)\right) + \mathcal{N}\left(v_{t,f}, \mu_n(t,f), \sum_n(t,f)\right)}, \quad [17]$$

where $\mathcal{N}(x, \mu, \Sigma)$ is the multi-variable joint Gaussian probability density function.

Noise Suppression Gain Calculation Based on Directional Model

Figure 3:
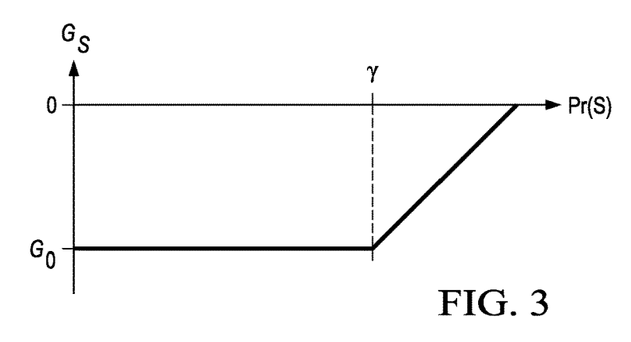
FIG. 3 is a diagram illustrating a noise suppression gain calculation based on a directionality model, according to some embodiments.

FIG. 3 is a diagram illustrating a noise suppression gain calculation based on speech/noise directionality model 105. The vertical axis is gain in dB, the horizontal axis is the probability of speech, and the noise suppression gain is given by:

$$G_S(t,f) = \begin{cases} G_0, & \text{when } Pr\{S\} \leq \gamma \\ \min\{0, G_0 + k_s[Pr\{S\} - \gamma]\}, & \text{otherwise} \end{cases}, \quad [18]$$

where $\gamma$ and $k_s$ are tuning parameters.

The final suppression gain G (t, f) is calculated (e.g., by noise suppression gain unit 107) for each band f and each block/frame t as:

$$G(t,f) = \begin{cases} G_L(t,f), & \text{when } \widetilde{SNR} > SNR_0 \\ G_S(t,f) + G_L(t,f), & \text{otherwise} \end{cases}, \quad [19]$$

where $SNR_0$ is a pre-defined signal to noise ratio threshold and $\widetilde{SNR}$ is the estimated signal to noise ratio for block/frame t.

In some embodiments, the estimated $\widetilde{SNR}$ in [19] can be obtained by using a VAD (Voice activity detector) output to drive an automatic gain control (AGC) component (not shown) to level the speech signal to a pre-defined power level (in dB), and subtract the estimated noise level $\mu_L$ (t, f) from the pre-defined power level, and estimate the speech level using a similar method as was used estimate noise, where:

$$\mu_S(t,f) = [1 - wp_s(t,f)] \cdot \mu_S(t-1,f) + wp_n(t,f) \cdot L_{t,f}, \text{ and} \quad [20]$$

$\widetilde{SNR}$ is calculated a:

$$\widetilde{SNR} = \mu_S(t,f) - \mu_L(t,f). \quad [21]$$

The final suppression gain G(t,f) is used in multiplication unit 108 to scale the subbands output by filterbank 101 to suppress the noise in each subband. For example, the gain G(t,f) is applied to all subbands k that belong to band f:

$$Y_t(k) = X_t(k) * G(t,f) \text{ for } k \in B(f), \quad [22]$$

wherein $Y_t(k)$ is the output of multiplication unit 108.

The output of multiplication unit 108 is then converted to a time domain output audio signal by inverse filterbank 109 to arrive at a noise suppressed output signal.

Example Process

Figure 4A:
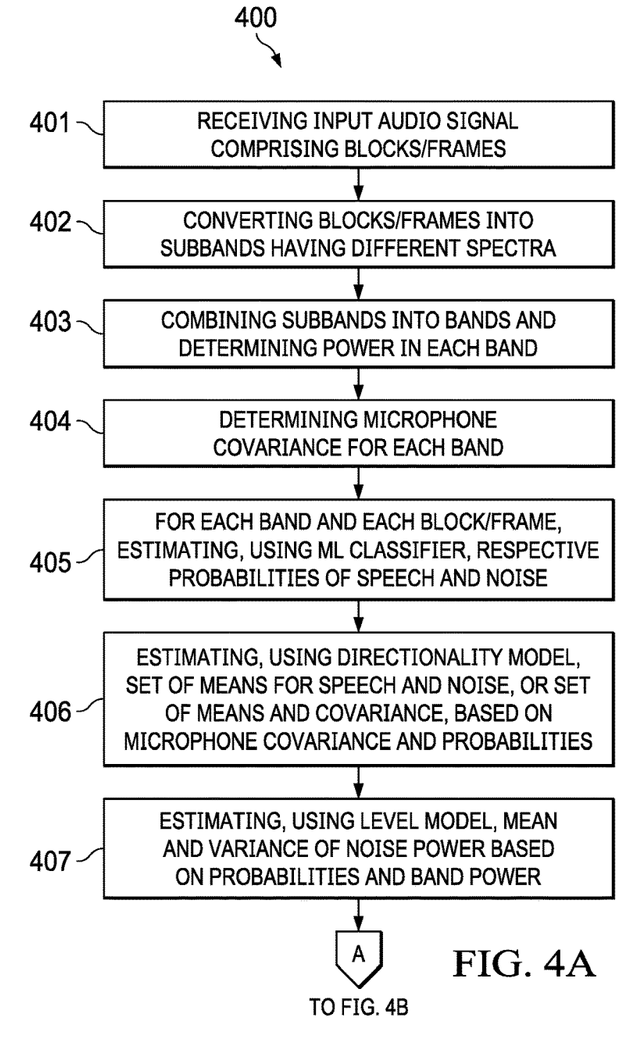
FIGS. 4A and 4B show a flow diagram of a process for noise estimation and suppression in voice communications using directionality and machine learning, according to some embodiments.
Figure 4B:
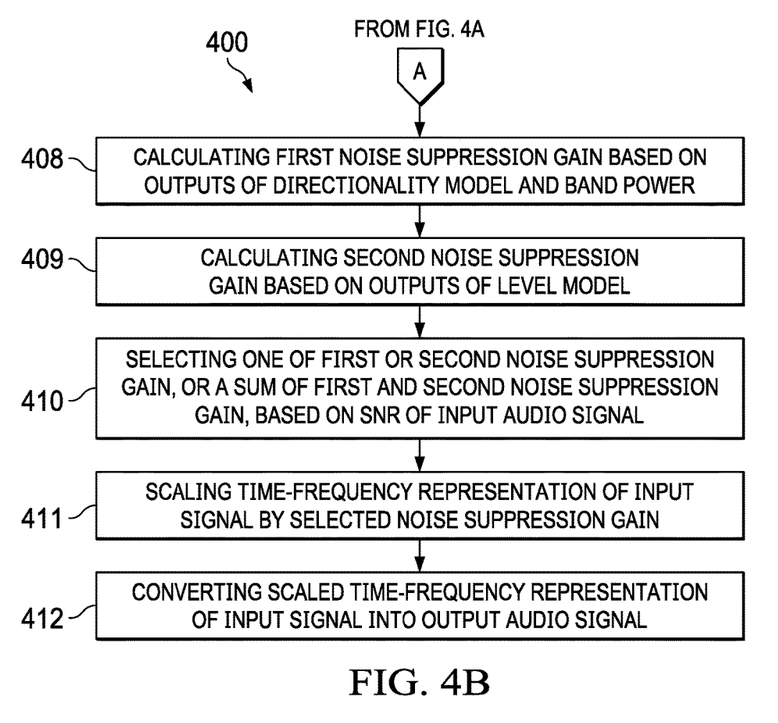

FIGS. 4A and 4B are a flow diagram of a process 400 noise estimation and suppression in voice communications using directionality and deep neural networks, according to some embodiments. Process 400 can be implemented using system 500 shown in FIG. 5.

Process 400 begins receiving an input audio signal comprising a number of blocks/frames (401). For each block/frame, process 400 continues by converting the block/frame into subbands (402), where each subband has a different spectra than the other subbands, combining the subbands into bands and determining a power in each band (403), and determining a microphone covariance based on the subbands (404).

Process 400 continues by, for each band and each block/frame, estimating, using a machine learning classifier (e.g., a neural network), respective probabilities of speech and noise (405), estimating, using a directionality model, a set of means for speech and noise, or a set of means and covariances for speech and noise, based on the microphone covariance and the probabilities (406), estimating, using a level model, a mean and variance of noise power based on the probabilities and the band powers (407), calculating a first noise suppression gain based on first outputs of the directionality model (408), determining a second noise suppression gain based on second outputs of the level model (409), and selecting one of the first noise suppression gain or the second noise suppression gain, or a sum of the first noise suppression gain and the second noise suppression gain, based on a signal to ratio of the input audio signal (410).

Process 400 continues by scaling each subband in each band by the selected first or second noise suppression gain for the band (411), and converting the scaled subbands into an output audio signal (412).

Example System Architecture

Figure 5:
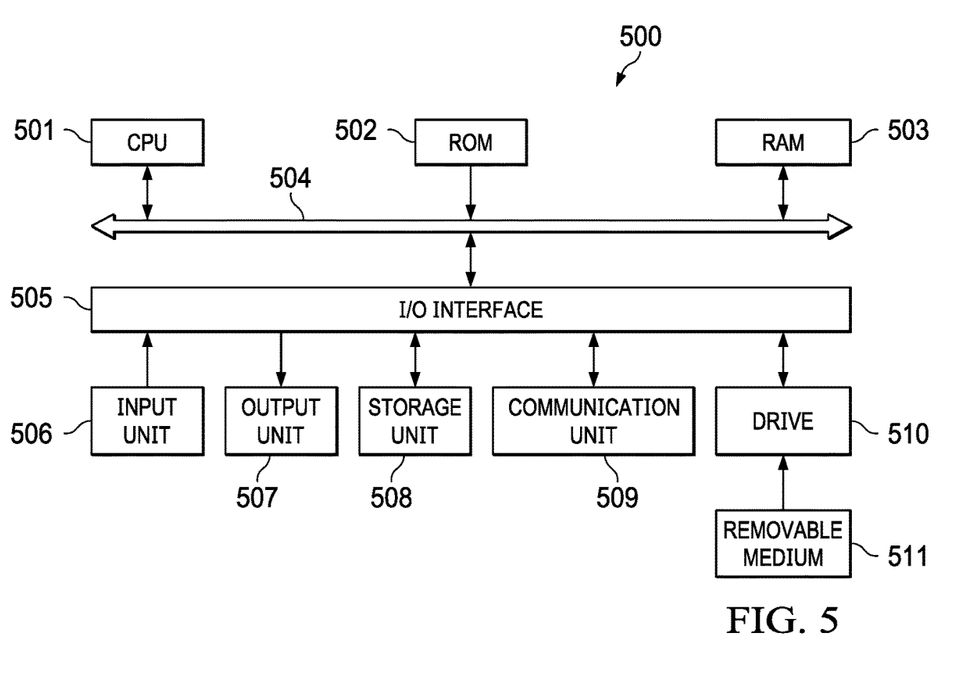
FIG. 5 is a block diagram of a system for implementing the features and processes described in reference to FIGS. 1-4, according to some embodiments.

FIG. 5 shows a block diagram of an example system for implementing the features and processes described in reference to FIGS. 1-5, according to an embodiment. System 500 includes any devices that are capable of playing audio, including but not limited to: smart phones, tablet computers, wearable computers, vehicle computers, game consoles, surround systems, kiosks.

As shown, the system 500 includes a central processing unit (CPU) 501 which is capable of performing various processes in accordance with a program stored in, for example, a read only memory (ROM) 502 or a program loaded from, for example, a storage unit 508 to a random access memory (RAM) 503. In the RAM 503, the data required when the CPU 501 performs the various processes is also stored, as required. The CPU 501, the ROM 502 and the RAM 503 are connected to one another via a bus 504. An input/output (I/O) interface 505 is also connected to the bus 504.

The following components are connected to the I/O interface 505: an input unit 506, that may include a keyboard, a mouse, or the like; an output unit 507 that may include a display such as a liquid crystal display (LCD) and one or more speakers; the storage unit 508 including a hard disk, or another suitable storage device; and a communication unit 509 including a network interface card such as a network card (e.g., wired or wireless).

In some implementations, the input unit 506 includes one or more microphones in different positions (depending on the host device) enabling capture of audio signals in various formats (e.g., mono, stereo, spatial, immersive, and other suitable formats).

In some implementations, the output unit 507 include systems with various number of speakers. As illustrated in FIG. 5, the output unit 507 (depending on the capabilities of the host device) can render audio signals in various formats (e.g., mono, stereo, immersive, binaural, and other suitable formats).

The communication unit 509 is configured to communicate with other devices (e.g., via a network). A drive 510 is also connected to the I/O interface 505, as required. A removable medium 511, such as a magnetic disk, an optical disk, a magneto-optical disk, a flash drive or another suitable removable medium is mounted on the drive 510, so that a computer program read therefrom is installed into the storage unit 508, as required. A person skilled in the art would understand that although the system 500 is described as including the above-described components, in real applications, it is possible to add, remove, and/or replace some of these components and all these modifications or alteration all fall within the scope of the present disclosure.

Aspects of the systems described herein may be implemented in an appropriate computer-based sound processing network environment for processing digital or digitized audio files.

Portions of the adaptive audio system may include one or more networks that comprise any desired number of individual machines, including one or more routers (not shown) that serve to buffer and route the data transmitted among the computers. Such a network may be built on various different network protocols, and may be the Internet, a Wide Area Network (WAN), a Local Area Network (LAN), or any combination thereof.

In accordance with example embodiments of the present disclosure, the processes described above may be implemented as computer software programs or on a computer-readable storage medium. For example, embodiments of the present disclosure include a computer program product including a computer program tangibly embodied on a machine readable medium, the computer program including program code for performing methods. In such embodiments, the computer program may be downloaded and mounted from the network via the communication unit 509, and/or installed from the removable medium 511, as shown in FIG. 5.

Generally, various example embodiments of the present disclosure may be implemented in hardware or special purpose circuits (e.g., control circuitry), software, logic or any combination thereof. For example, the units discussed above can be executed by control circuitry (e.g., a CPU in combination with other components of FIG. 5), thus, the control circuitry may be performing the actions described in this disclosure. Some aspects may be implemented in hardware, while other aspects may be implemented in firmware or software which may be executed by a controller, microprocessor or other computing device (e.g., control circuitry). While various aspects of the example embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Additionally, various blocks shown in the flowcharts may be viewed as method steps, and/or as operations that result from operation of computer program code, and/or as a plurality of coupled logic circuit elements constructed to carry out the associated function(s). For example, embodiments of the present disclosure include a computer program product including a computer program tangibly embodied on a machine readable medium, the computer program containing program codes configured to carry out the methods as described above.

In the context of the disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may be non-transitory and may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the present disclosure may be written in any combination of one or more programming languages. These computer program codes may be provided to a processor of a general purpose computer, special purpose computer, or other programmable data processing apparatus that has control circuitry, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server or distributed over one or more remote computers and/or servers.

While this document contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method of audio processing, comprising:
receiving, using at least one processor, bands of power spectra of an input audio signal and a microphone covariance for each band, wherein the microphone covariance is based on a configuration of microphones used to capture the input audio signal;
for each band:
estimating, using a machine learning classifier, respective probabilities of speech and noise;
estimating, using a directionality model, a set of means for speech and noise, or a set of means and covariances for speech and noise, based on the microphone covariance for the band and the probabilities;
estimating, using a level model, a mean and covariance of noise power based on the probabilities and the power spectra;
determining, using the at least one processor, a first noise suppression gain based on outputs of the directionality model;
determining, using the at least one processor, a second noise suppression gain based on outputs of the level model;
selecting, using the at least one processor, one of the first noise suppression gain or the second noise suppression gain, or a sum of the first noise suppression gain and the second noise suppression gain, based on a signal to noise ratio of the input audio signal;
scaling, using the at least one processor, a time-frequency representation of the input signal by the selected one of the first noise suppression gain or second noise suppression gain, or the sum of the first noise suppression gain and the second noise suppression gain, for the band; and
converting, using the at least one processor, the time-frequency representation into an output audio signal.

2. The method of claim 1, further comprising:
receiving, using the at least one processor, an input audio signal comprising a number of blocks/frames;
for each block/frame:
converting, using the at least one processor, the block/frame into subbands, each subband having different spectra than the other subbands;
combining, using the at least one processor, the subbands into bands; and
determining, using the at least one processor, the banded power.

3. The method of claim 1, wherein the machine learning classifier is a neural network.

4. The method of claim 1, wherein the microphone covariance is represented as a normalized vector.

5. The method of claim 1, wherein determining the first noise suppression gain, comprises:
calculating a probability of speech for the band;
setting the first noise suppression gain equal to a maximum suppression gain if the probability of speech for the band is less than a threshold; and
setting the first noise suppression gain by ramping from the maximum suppression gain toward zero for increasing probability of speech.

6. The method of claim 5, wherein the probability of speech is calculated using the set of means for speech and noise and the covariance estimated by the directionality model.

7. The method of claim 5, wherein the probability of speech is calculated using the set of means for speech and noise and the covariance estimated by the directionality model, and a multi-variable, joint Gaussian density function.

8. The method of claim 1, wherein determining the second noise suppression gain, comprises:
setting the second noise suppression gain equal to a maximum suppression gain if the band power is less than a first threshold;
setting the noise suppression gain by ramping from the maximum suppression gain toward zero for increasing probability of speech.

9. The method of claim 1, wherein the estimation using the directionality model uses time-frequency tiles that are classified as speech and noise but excludes time-frequency tiles that are classified as reverberation.

10. The method of claim 1, wherein estimating, using a directionality or level model, a mean for speech based on the microphone covariance for the band and the probability of speech, further comprises:
computing a time average estimate of the mean for speech using a first order low pass filter with the mean for speech and the microphone covariance as inputs to the filter, and weighting the inputs to the filter by the probability of speech.

11. The method of claim 1, wherein estimating, using a directionality or level model, a mean for noise based on the microphone covariance for the band and the probability of noise, further comprises:
computing a time average estimate of the mean for noise using a first order low pass filter with the mean for noise and the microphone covariance vector as inputs to the filter, and weighting the inputs to the filter by the probability of noise.

12. The method of claim 1, wherein estimating, using a directionality or level model, a covariance for speech based on the microphone covariance for the band and the probability of speech, further comprises:
computing a time average estimate of the covariance for speech using a first order low pass filter with the covariance for speech and the microphone covariance vector as inputs to the filter, and weighting the inputs to the filter by the probability of speech.

13. The method of claim 1, wherein estimating, using a directionality or level model, a covariance for noise based on the microphone covariance for the band and the probability of noise, further comprises:
    computing a time average estimate of the covariance for noise using a first order low pass filter with the covariance for noise and the microphone covariance vector as inputs to the filter, and weighting the inputs to the filter by the probability of noise.

14. A system comprising:
one or more computer processors; and
a non-transitory computer-readable medium storing instructions that, when executed by the one or more computer processors, cause the one or more processors to perform operations of claim 1.

15. A non-transitory computer-readable medium storing instructions that, when executed by one or more computer processors, cause the one or more processors to perform operations of claim 1.

* * * * *